US012699067B2

(12) United States Patent
Chen et al.

(10) Patent No.: US 12,699,067 B2
(45) Date of Patent: Aug. 4, 2026

(54) ELECTROCHEMICAL BIOSENSOR AND THE MANUFACTURING METHOD THEREOF

(71) Applicants: China Medical University, Taichung City (TW); China Medical University Hospital, Taichung City (TW)

(72) Inventors: Yi-Wen Chen, Taichung City (TW); Yi-An Chen, Kaohsiung City (TW); Ming-You Shie, Taichung City (TW)

(73) Assignees: China Medical University, Taichung City (TW); China Medical University Hospital, Taichung City (TW)

( * ) Notice: Subject to any disclaimer, the term of this patent is extended or adjusted under 35 U.S.C. 154(b) by 294 days.

(21) Appl. No.: 18/311,957

(22) Filed: May 4, 2023

(65) Prior Publication Data

US 2024/0230579 A1 Jul. 11, 2024

(30) Foreign Application Priority Data

Jan. 5, 2023 (TW) ................................. 112100434

(51) Int. Cl.
*G01N 27/327* (2006.01)
*B82Y 15/00* (2011.01)
*B82Y 30/00* (2011.01)

(52) U.S. Cl.
CPC .......... *G01N 27/3278* (2013.01); *B82Y 15/00* (2013.01); *B82Y 30/00* (2013.01)

(58) Field of Classification Search
CPC ..... G01N 27/3278; B82Y 15/00; B82Y 30/00
See application file for complete search history.

(56) References Cited

U.S. PATENT DOCUMENTS

2012/0097917 A1* 4/2012 Zhou ..................... B82Y 40/00
977/773
2018/0275088 A1* 9/2018 Huff ................... B01L 3/50273

OTHER PUBLICATIONS

Cho, KR2017/0082947 machine translation (Year: 2017).*
Niu, CN113155933B machine translation (Year: 2022).*
Li, CN109085225B machine translation (Year: 2020).*
L. Wang, Core@shell nanomaterials: gold-coated magnetic oxide nanoparticles, J. of Materials Chemistry, 2008 (18), pp. 2629-2635 (Year: 2008).*
S. Augustine, Amine-Functionalized MoO3@RGO Nanohybrid-Based Biosensor for Breast Cancer Detection, ACS Appl. Bio Mater. 2019(2), pp. 5366-5378 (Year: 2019).*
J. Zhang, Enhanced trimethylamine sensing performance of single-crystal MoO3 nanobelts decorated with Au nanoparticles, Journal of Alloys and Compounds, 2016(685), pp. 1024-1033 (Year: 2016).*

* cited by examiner

*Primary Examiner* — C. Sun
(74) *Attorney, Agent, or Firm* — Best & Flanagan LLP

(57) ABSTRACT

An electrochemical biosensor has an electrode which is sequentially decorated a molybdenum (VI) oxide (MoO$_3$) nanomaterial, a gold-composite nanomaterial, a carboxyl-sulfhydryl compound, and a carbodiimide/N-hydroxysuccinimide (EDC/NHS, EN) to modify the surface of the electrode. That the sulfhydryl group of the carboxyl-sulfhydryl compound forms a bond with the gold-composite nanomaterial, and the carbodiimide/N-hydroxybutanediimide forms a bond with a carboxyl group of the carboxyl-sulfhydryl compound.

6 Claims, 22 Drawing Sheets

ELECTROCHEMICAL BIOSENSOR AND THE MANUFACTURING METHOD THEREOF

BACKGROUND OF THE INVENTION

1. Field of the Invention

The present invention is related to a biological sensor, particular to biological electrochemical sensor.

2. Description of Related Art

The medical detection by the conventional biological detection devices or chips is cumbersome and difficult to operate, and it takes a lot of time to operate and wait for the results. Also, the detection limit and detection sensitivity of the conventional devices are poor, to increase the number of detection samples or repeat the detection process for the confirmation is necessary. Such way increases the cost of manpower and time. Therefore, there is a need to develop a biosensor that can optimize and enhance performance and sensitivity.

SUMMARY OF THE INVENTION

In order to provide a biosensor that can improve performance and sensitivity, the present invention provides an electrochemical biosensor, which includes: a working electrode with a surface sequentially coating with a molybdenum trioxide nanomaterial and a gold nanocomposite for modifying the working electrode, and a carboxyl-mercapto compound and a N-3-dimethylaminopropyl-N'-ethylcarbodiimide hydrochloride/N-hydroxysuccinimide (EDC/NHS, EN) for modification, wherein, bonds form between mercapto group of the carboxyl-mercapto compound and gold nanocomposites, and the N-3-dimethylaminopropyl-N'-ethylcarbodiimide hydrochloride/N-hydroxysuccinimide (EDC/NHS, EN) bonds with carboxyl group of the carboxyl-mercapto compound.

Preferably, a marker is attached to the N-3-dimethylaminopropyl-N'-ethylcarbodiimide hydrochloride/N-hydroxysuccinimide (EDC/NHS, EN).

Preferably, the gold nanocomposite is formed by the attachment of a nano-gold particle on a metal oxide nanomaterial, wherein the metal of metal oxide nanomaterial comprises scandium (Sc), titanium (Ti), vanadium (V), chromium (Cr), manganese (Mn), iron (Fe), cobalt (Co), nickel (Ni), copper (Cu), zinc (Zn), molybdenum (Mo), tungsten (W), seaborgium (Sg), aluminum (Al), gallium (Ga), indium (In) or thallium (Tl), and the shape of the metal oxide nanomaterial include rods, flakes, and spheres or flowers.

Preferably, the carboxyl-mercapto compound is cysteine.

Preferably, the marker is a primary antibody, and the primary antibody is a heat shock protein antibody, a calreticulin antibody, or a high mobility group box protein 1 antibody.

The present invention further provides a method for making an electrochemical biosensor, the steps include:
- a molybdenum trioxide nanomaterial and a gold nanocomposite sequentially coating on the surface of a working electrode for modification and then drying;
- a carboxyl-mercapto compound coating on the surface of the working electrode to make a mercapto group of the carboxyl-mercapto compound bond to the gold nanocomposite;

a N-3-dimethylaminopropyl-N'-ethylcarbodiimide hydrochloride/N-hydroxysuccinimide (EDC/NHS, EN) coating on the surface of the working electrode to form a bond between the N-3-dimethylaminopropyl-N'-ethylcarbodiimide hydrochloride/N-hydroxysuccinimide (EDC/NHS, EN) and the carboxyl group of the carboxyl-mercapto compound and then drying.

Preferably, a marker is attached on the surface of the working electrode and attached to the N-3-dimethylaminopropyl-N'-ethylcarbodiimide hydrochloride/N-hydroxysuccinimide (EDC/NHS, EN).

Preferably, the manufacturing steps of the molybdenum trioxide nanomaterial include: dissolving 1 to 50 g of ammonium heptamolybdate tetrahydrate and 0.90 to 45 g of thioacetamide in 30 to 150 mL of water, adding 10 to 50 mL of ethanol and 10 to 50 mL of N-methyl pyrrolidone, and stirring to form a uniformly mixed solution; heating the mixed solution at 220° C. to obtain molybdenum disulfide nanomaterial; and annealing molybdenum disulfide nanomaterial at 400° C. to form molybdenum trioxide nanomaterial.

Preferably, the manufacturing steps of the gold nanocomposite includes: dispersing a metal oxide nanomaterial in aqueous solution, adding 140 mg to 7 g of polyvinylpyrrolidone and 1 to 50 ml of sodium citrate aqueous solution and stirring and heating until boiling, slowly adding 80 to 400 mL of 200 mM gold(III) chloride trihydrate to form gold nanoparticles coated on a surface of the metal oxide nanomaterial, and then cooling to room temperature and drying to obtain the gold nanocomposite.

Preferably, the metal of metal oxide nanomaterial is scandium (Sc), titanium (Ti), vanadium (V), chromium (Cr), manganese (Mn), iron (Fe), cobalt (Co), nickel (Ni), copper (Cu), zinc (Zn), molybdenum (Mo), tungsten (W), seaborgium (Sg), aluminum (Al), gallium (Ga), indium (In) or thallium (Tl).

More preferably, the carboxyl-mercapto compound is cysteine; and the marker is a primary antibody.

More preferably, the primary antibody is a heat shock protein antibody, a calreticulin antibody, or a high mobility group box 1 antibody.

By modification of molybdenum trioxide nanomaterial (MoO$_3$) and gold nanocomposite on the working electrode 10 of the present invention, the electrochemical performance of high charge transfer capability and enhanced active surface area of the working electrode are improved. In addition, the molybdenum trioxide (MoO$_3$) itself is non-toxic, and the use of molybdenum trioxide nanomaterial (MoO$_3$) shows eco-friendly and a better biocompatibility and enhances biological electrochemical immunosensing detection capability.

The biological electrochemical immunosensor of the present invention could specific bind to the target by selecting the specific markers 20, by the binding between the target and the marker 20 to drive charge transfer and the biological electrochemical reaction. Such reaction could detect the concentration and changes of the target in real time and accurately and be applied to medical detection, such as cancers, immune diseases, detecting special diseases or genes etc. Therefore, the present invention shows great potentials in medical fields

DETAILED DESCRIPTION OF THE PREFERRED EMBODIMENT

Figure 1:
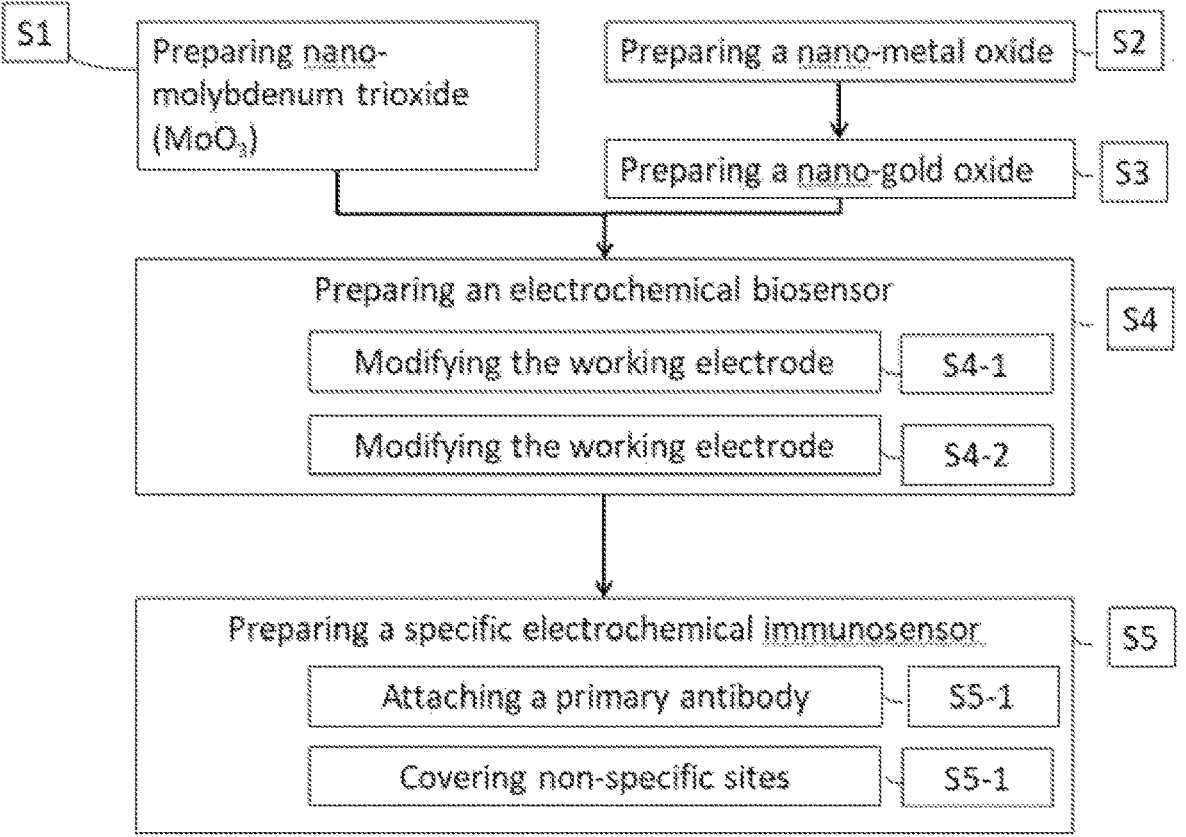
FIG. 1 is a flow chart of a preferred embodiment of the present invention.
Figure 2:
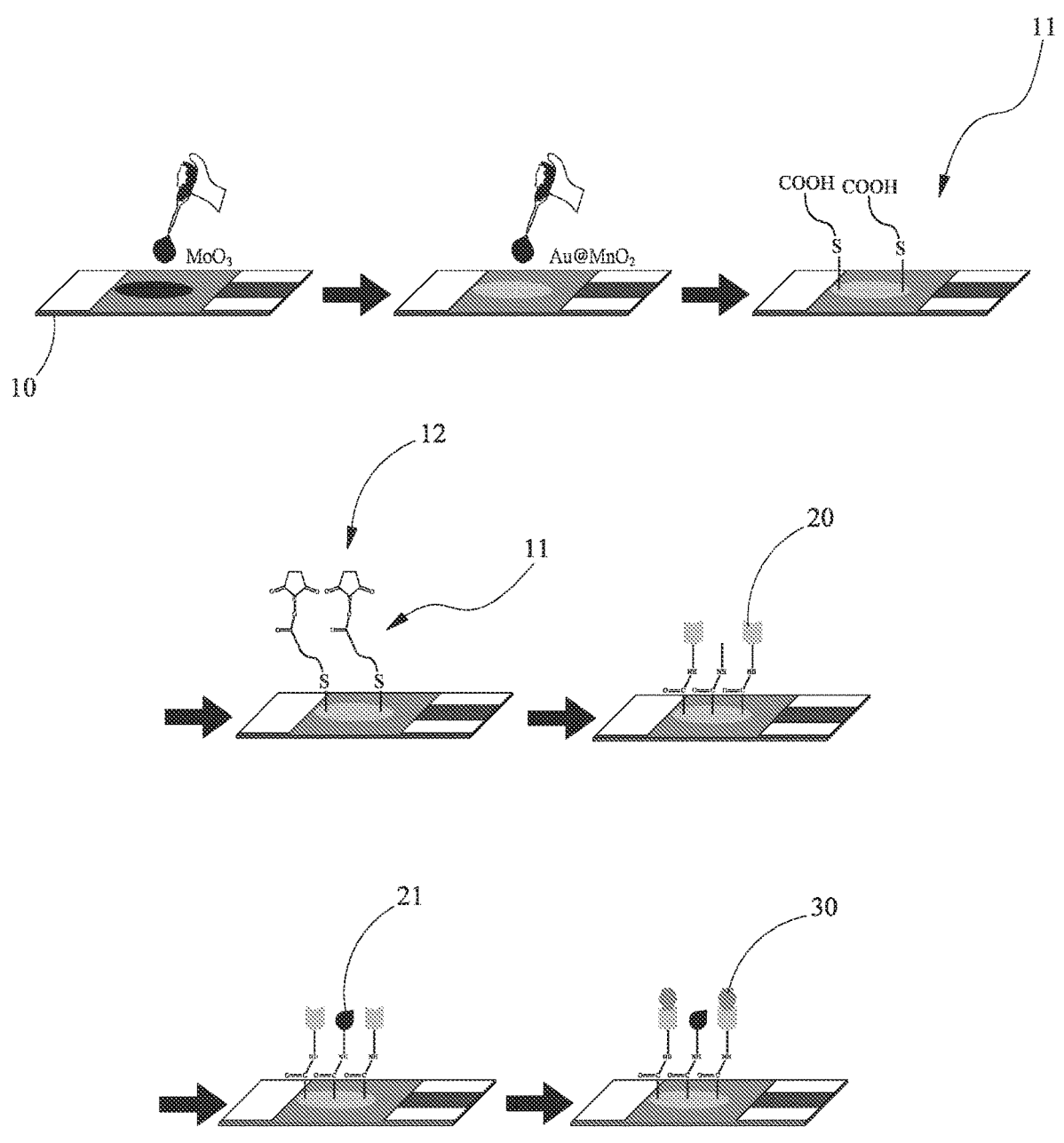
FIG. 2 is a flow chart of the process of a preferred embodiment of the present invention.

Please refer to FIG. 1 and FIG. 2, which are the manufacturing process of the preferred embodiments of an electrochemical biosensor provided by the present invention. The electrochemistry is the relationship between electrical potential and chemical reaction. Charge transfer occurs when bonding is formed between molecules or when a redox reaction occurs, and in turn leads to an electrochemical reaction. The present invention provides an electrode with molybdenum trioxide nanomaterial ($MoO_3$) and gold nanocomposite to develop an electrochemical biosensor with high sensitivity, high charge transfer ability and enhanced active surface area. The steps of manufacturing the electrochemical biosensor include:

Step S1, preparing molybdenum trioxide nanomaterial ($MoO_3$):

One to fifty g of ammonium orthomolybdate (($NH_4$)$_6$ $Mo_7O_{24}$) and 0.90 to 45 g of thioacetamide ($NH_2CSNH_2$) were dissolved in 30 to 150 ml water. Then add 10 to 50 ml of ethanol (EtOH) and 10 to 50 ml of N-methyl pyrrolidone ($C_5H_9NO$, NMP), and stirred and mixed well to form a mixed solution.

The mixed solution was heated at 220° C. for 6 hours, washed with water and ethanol, and dried to obtain molybdenum disulfide ($MoS_2$) nanomaterial.

Molybdenum disulfide ($MoS_2$) nanomaterial was heat-treated (annealing) at 400° C. for 1 hour to obtain molybdenum trioxide nanomaterial ($MoO_3$).

Step S2, preparing a metal oxide nanomaterial:

Preferably, metal of the metal oxide includes, and not limited, any material that can be used to form the metal oxide is included in the scope of the present invention. Preferably, metal of the metal oxide nanomaterial could be scandium (Sc), titanium (Ti), vanadium (V), chromium (Cr), manganese (Mn), iron (Fe), cobalt (Co), nickel (Ni), copper (Cu), zinc (Zn), molybdenum (Mo), tungsten (W), seaborgium (Sg), aluminum (Al), gallium (Ga), indium (In) or thallium (Tl).

Wherein, the forms of the metal oxide nanomaterial are not limited, and any material that could make the gold (Au) nanoparticle coat on the surface of the metal oxide nanomaterial is covered by the scope of the present invention. Preferably, the shape of the metal oxide nanomaterial could be rods, flakes, spheres or flowers.

Step S3, preparing a gold nanocomposite:

The method of coating the gold nanoparticles on the surface of the metal oxide nanomaterial is performed by a hot water method. It is worth noting that the hot water method was conducted based on the selection of the metal oxide nanomaterial, and the amount of the following materials was also adjusted accordingly. The metal oxide nanomaterial obtained from step S2 was dispersed in aqueous solution, and 140 mg to 7 g of polyvinylpyrrolidone (PVP) and 1 to 50 ml of 1% (wt %) sodium citrate aqueous solution with a concentration were added and stirred, and then heated to 100° C. to boil.

Then, 80 to 400 μL, 200 mM gold(III) chloride trihydrate (HAuCl) was slowly added and reacted for 30 minutes to coat the gold nanoparticles on the surface of the metal oxidize. After cooling to room temperature, it was dried at 60° C. for 12 hours to form the gold nanocomposite.

Step S4, preparing an electrochemical biosensor:

The molybdenum trioxide nanomaterial ($MoO_3$) prepared by step S1 and the gold nanocomposite prepared by step S3 were dispersed in aqueous solution, and sequentially modified the surface of a working electrode 10. A carboxyl-mercapto compound (COOH—N—SH) 11 was used to modify the working electrode. Finally, it is reacted with N-3-dimethylaminopropyl-N'-ethylcarbodiimide hydrochloride/N-hydroxysuccinimide (EDC/NHS, EN), so that the carboxyl-mercapto compound (COOH—N—SH) 11 bonded to N-3-dimethylaminopropyl-N'-ethylcarbodiimide hydrochloride/N-hydroxysuccinimide (EDC/NHS, EN) to obtain biological electrochemical immunosensors.

Further with reference to FIG. 2, step S4 further comprises the following steps:

Step S4-1, modifying the working electrode 10: the molybdenum trioxide nanomaterial ($MoO_3$) was sequentially dropped in aqueous solution for dispersion and the gold nanocomposite dropped onto the surface of the working electrode 10 for modification, and dried at 45° C.

Preferably, the working electrode 10 was dried at 45° C. after dropping molybdenum trioxide nanomaterial ($MoO_3$)

and gold nanocomposite, or after dropping the gold nanocomposite and then dried at 45° C.

Step S4-2, modifying the working electrode 10: the carboxyl-mercapto compound (COOH—N—SH) 11 was dissolved in water, and dropped it on the surface of the working electrode 10. At this time, the sulfhydryl group (—SH) of the carboxyl-mercapto compound (COOH—N—SH) 11 would self-assemble on the gold nanocomposite.

Then, N-3-dimethylaminopropyl-N'-ethylcarbodiimide hydrochloride/N-hydroxysuccinimide (EDC/NHS, EN) 12 was dissolved in aqueous solution, and after being dropped onto the surface of the working electrode 10 and incubated at 37° C. for 1 hour. The N-3-dimethylaminopropyl-N'-ethylcarbodiimide hydrochloride/N-hydroxysuccinimide (EDC/NHS, EN) 12 would bond to the carboxyl group (—COOH) of the carboxy-mercapto compound (COOH—N—SH) 11. Finally, excess N-3-dimethylaminopropyl-N'-ethylcarbodiimide hydrochloride/N-hydroxysuccinimide (EDC/NHS, EN) 12 was removed by washing with PBS buffer, and dried with pure nitrogen.

Preferably, the carboxyl-mercapto compound (COOH—N—SH) 11 could be a molecule having a mercapto group (—SH) at any end and a carboxyl group (—COOH) at the other end. Preferably, the chemical structure of the carboxyl-mercapto compound (COOH—N—SH) 11 could be COOH—$(C_nH_{n+1})$—SH (n≥1), for example: 3-mercaptopropionic acid (MPA), 6-mercaptohexanoic acid (MHA), 11-mercaptoundecanoic acid (MUA), 2-thiophenecarboxylic acid, 3-thiophenecarboxylic acid, 2-thiopheneacetic acid, 3-thiopheneacetic acid, 2-thiopheneglyoxylic acid, or 3-thiopheneacetic acid.

Or, the chemical structure of the carboxyl-mercapto compound (COOH—N—SH) 11 could be SH—$(C_{2n}H_{4n+2}O_{n+1})$—COOH (n≥1), that is, poly(ethylene glycol) 2-mercaptoethyl ether acetic acid (HS-PEG-COOH) or its derivatives. More preferably, the carboxyl-mercapto compound (COOH—N—SH) 11 could be cysteine.

Step S5, preparing a specific electrochemical immunosensor: a target of the biological electrochemical immunosensor could be select according to needs, and the target might be a gene sequence, a protein or a cell, and a marker 20 that specifically bonded to the target on the biological electrochemical immunosensor to achieve a specific detection. In the present invention, a primary antibody 20 specifically binding to the target was used as a label based on the antibody-antigen reaction to be a preferred embodiment.

Step S5-1, attaching a primary antibody 20: according to the detecting target, a corresponding primary antibody 20 was dropped onto the surface of the working electrode 10 and incubated at room temperature in a humid environment for 1 hour, and the primary antibody 20 was attached to N-3-dimethylaminopropyl-N'-ethylcarbodiimide hydrochloride/N-hydroxysuccinimide (EDC/NHS, EN). Finally, the surface of the working electrode 10 was washed with phosphate-buffered saline (PBS) to remove the unbinding primary antibody 20.

Step S5-2, covering non-specific sites: then bovine serum albumin (BSA) 21 was dropped onto the surface of the working electrode 10 to further cover the non-specific site of the working electrode 10 to obtain a specific electrochemical immunosensor. Bovine serum albumin 21 could avoid subsequent unnecessary interference and reduce noise.

In order to confirm whether the specific electrochemical immunosensor is practical, an antigen 30 was used as the target in the present invention to confirm whether the antigen 30 could be attached to the specific electrochemical immunosensor. Following to confirm if the antigen 30 was attached to chemical immunosensor by electrochemical characteristic test.

Preferably, the step of attaching the antigen 30 includes: the antigen 30 corresponding to the primary antibody 20 was dropped onto the surface of the working electrode 10, and incubating for 1 hour in a room temperature in a humid environment, so that the antigen 30 attached to the primary antibody 20. Finally, the surface of the working electrode 10 was washed with phosphate-buffered saline (PBS) to remove the unbinding antigen 30, and then electrochemical characteristic analysis was performed.

The present invention further provides the biological electrochemical immunosensor/the specific electrochemical immunosensor made in the following embodiments, and performs the electrochemical characteristic test for each of the biological electrochemical immunosensor/the specific electrochemical immunosensor.

Embodiment 1

Step S1, preparing molybdenum trioxide nanomaterial $(MoO_3)$:

One gram of ammonium heptamolybdate tetrahydrate $((NH_4)_6Mo_7O_{24} \cdot 4H_2O)$ and 0.9 g of thioacetamide $(NH_2CSNH_2)$ were dissolved in 30 mL of water. Ethanol (EtOH) and N-methyl pyrrolidone $(C_5H_9NO, NMP)$ were added. After mixing uniformly to form a mixed solution, the mixed solution was put into a stainless steel autoclave lined with Teflon and sealed, and reacted at 220° C. for 6 hours.

When the reaction was completed, the mixed solution was poured into deionized water and ethanol (EtOH), and washed by ultrasonic vibration and centrifugation, and finally dried at 60° C. for 6 hours to obtain molybdenum disulfide $(MoS_2)$ nanomaterial. Molybdenum disulfide $(MoS_2)$ nanomaterials were then heat-treated at 400° C. for 1 hour to form molybdenum trioxide nanomaterial $(MoO_3)$.

Figure 3A:
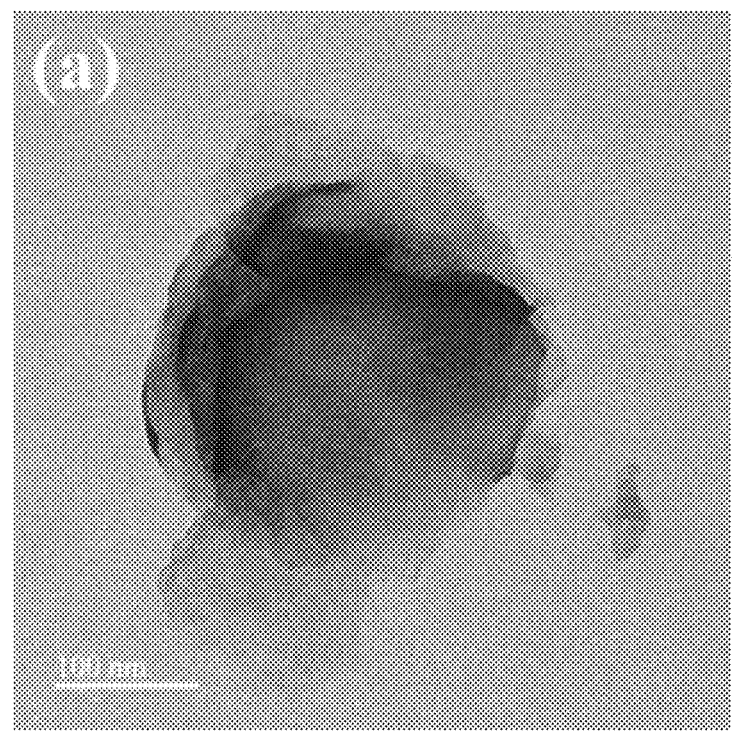
FIG. 3a is a crystal structure of molybdenum disulfide nanomaterial in a preferred embodiment of the present invention.
Figure 3B:
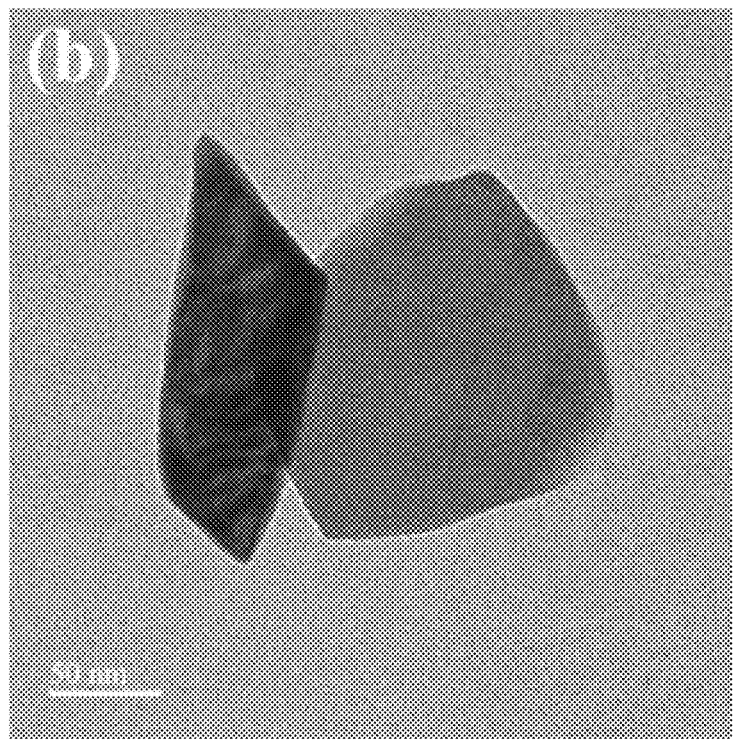
FIG. 3b is a crystal structure of molybdenum trioxide nanomaterial in a preferred embodiment of the present invention.

As shown in FIGS. 3a and 3b, nano-molybdenum disulfide $(MoS_2)$ particles and molybdenum trioxide nanomaterial $(MoO_3)$ crystals obtained of the present invention were further observed through a transmission electron microscope (TEM). From FIG. 3a, it was observed that the molybdenum disulfide $(MoS_2)$ nanomaterials were irregular and translucent nano-fragments, indicating that the molybdenum disulfide $(MoS_2)$ nanomaterial formed a thin layer structure with fewer stacks.

After annealing the molybdenum disulfide $(MoS_2)$ nanomaterial at 400° C. for 1 hour, it could be obviously seen in FIG. 3b that the irregular nano-scale fragments had transformed into regular nano-sheets. It is inferred that the crystal structure of molybdenum disulfide $(MoS_2)$ nanomaterial might be changed.

Figure 3C:
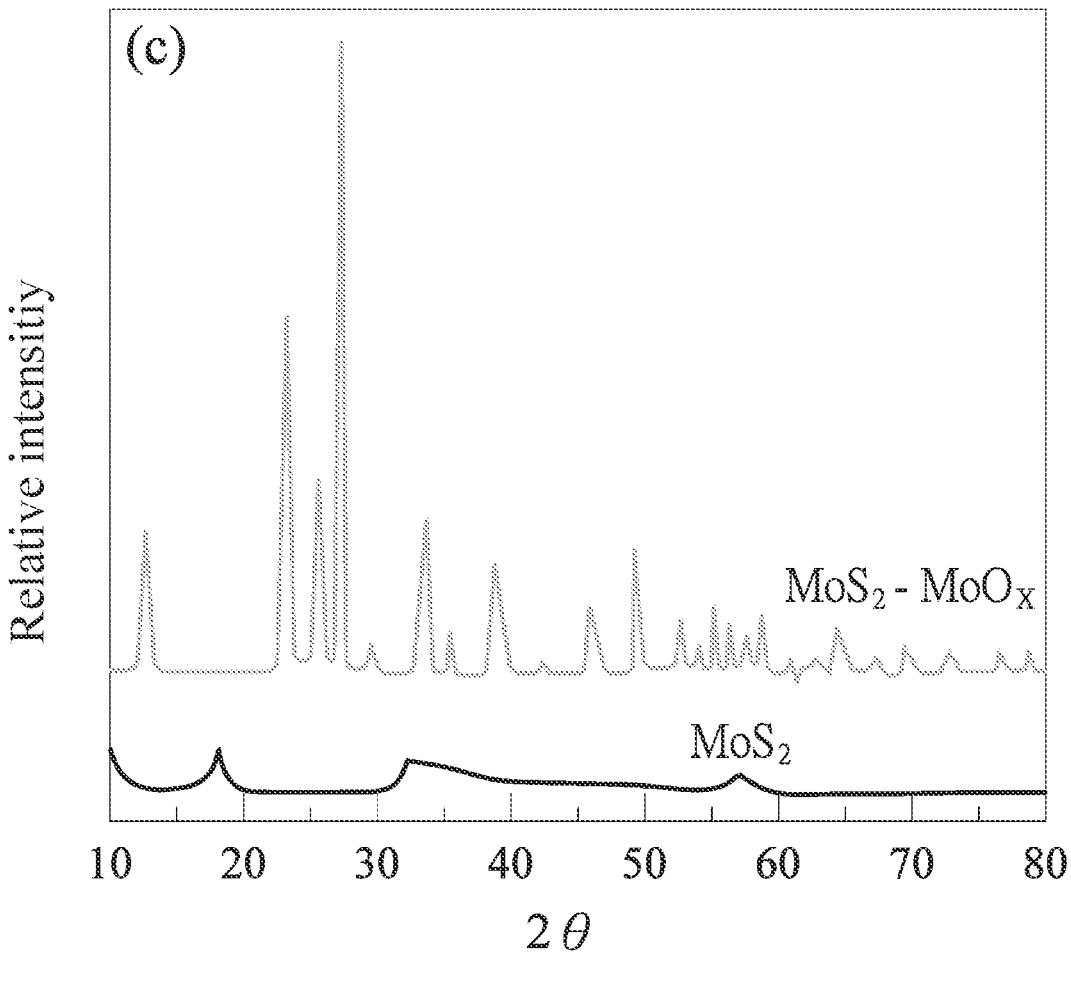
FIG. 3c is a X-ray diffraction of the product obtained from step 1 of the preferred embodiment of the present invention.

The materials were further analyzed by X-ray diffraction (XRD). In FIG. 3c, three weaker diffraction peaks formed at 13.9 degrees, 32.8 degrees and 57.6 degrees of the molybdenum disulfide $(MoS_2)$ nanomaterial could be observed. Such results corresponded to the lattice plane of the (002), (100) and (110) positions of nanoparticles. It means that the molybdenum disulfide $(MoS_2)$ nanomaterial is the hexagonal phase, and it is also confirmed that the molybdenum disulfide $(MoS_2)$ nanomaterial has a thin layer structure and is consistent with the TEM results in FIG. 3a.

In addition, after annealing of molybdenum disulfide $(MoS_2—MoO_x)$ nanomaterial, it is observed that the diffraction peaks were formed at 12.83 degrees, 23.46 degrees, 25.76 degrees, 27.45 degrees, 29.26 degrees, 33.73 degrees, 35.55 degrees, 39.05 degrees, 46.18 degrees, 49.32 degrees, 52.58 degrees, 55.37 degrees, 58.98 degrees, 64.62 degrees and 67.81 degrees. It could be corresponded to (020), (110), (040), (021), (130), (131), (111), (150), (002), (230), (211), (112), (081), (062) and (270) positions in the lattice plane of the nanoparticles. The structure was classified to be $\alpha$-MoO$_3$, which belonged to the orthorhombic phase. Also, it was also meet the diffraction data numbered 80-95 in the database established by the Joint Committee on Powder Diffraction Standards (JCPDS), indicating that molybdenum trioxide nanomaterial (MoO$_3$) had been successfully made.

Step S2, preparing a metal oxide nanomaterial:

In this embodiment, manganese dioxide (MnO$_2$) nanomaterial was used as the metal oxide nanomaterial. Potassium permanganate (KMnO$_4$) and manganese sulfate (MnSO$_4$) were precursors and the synthesis was carried out by hydrothermal method. First, 0.01M potassium permanganate (KMnO$_4$) solution and 0.005M manganese sulfate (MnSO$_4$) solution were prepared. And 25 mL of KMnO$_4$ solution was gradually added into 25 mL of MnSO$_4$ solution and stirred for 10 minutes.

Then the mixed solution was moved to a stainless steel autoclave with Teflon lining for reaction for 1 hour at 140° C. Then ionized water and ethanol was added and a product was washed by ultrasonic vibration and centrifugation. Finally, the product was dried at 60° C. for 12 hours to obtain the manganese dioxide (MnO$_2$) nanomaterial.

Step S3, preparing a gold nanocomposite:

Gold nanoparticles (Au) were coated on the surface of the manganese dioxide (MnO$_2$) nanomaterial to obtain gold-coated manganese dioxide nanocomposites (Au@MnO$_2$).

Fifth mg of the manganese dioxide (MnO$_2$) nanomaterial was dispersed in 50 mL aqueous solution. 140 mg of polyvinylpyrrolidone (PVP) and 1 mL of sodium citrate aqueous solution were added to the above solution containing nan-manganese dioxide (MnO$_2$). The mixed solution was stirred and heated to 100° C. After boiling, 80 $\mu$l of gold(III) chloride trihydrate (HAuCl$_4$) were slowly added by dropping. After reacting for 30 minutes, it was cooled and cleaned by ultrasonic vibration and centrifugation, and finally dried at 60° C. for 12 hours to obtain gold-coated manganese dioxide nanocomposites (Au@MnO$_2$).

Figure 4A:
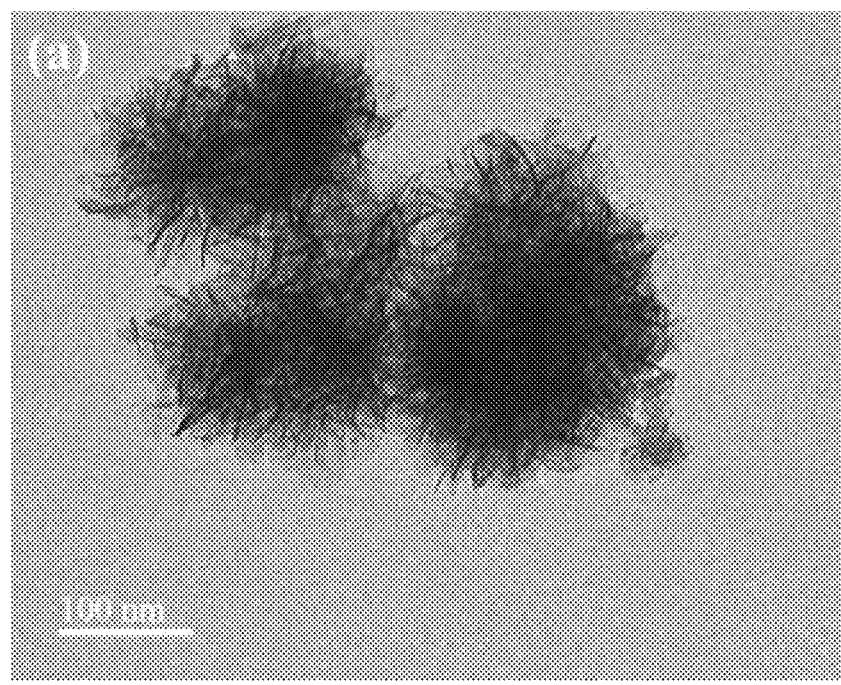
FIG. 4a is a crystal structure of manganese dioxide nanomaterial in a preferred embodiment of the present invention.
Figure 4B:
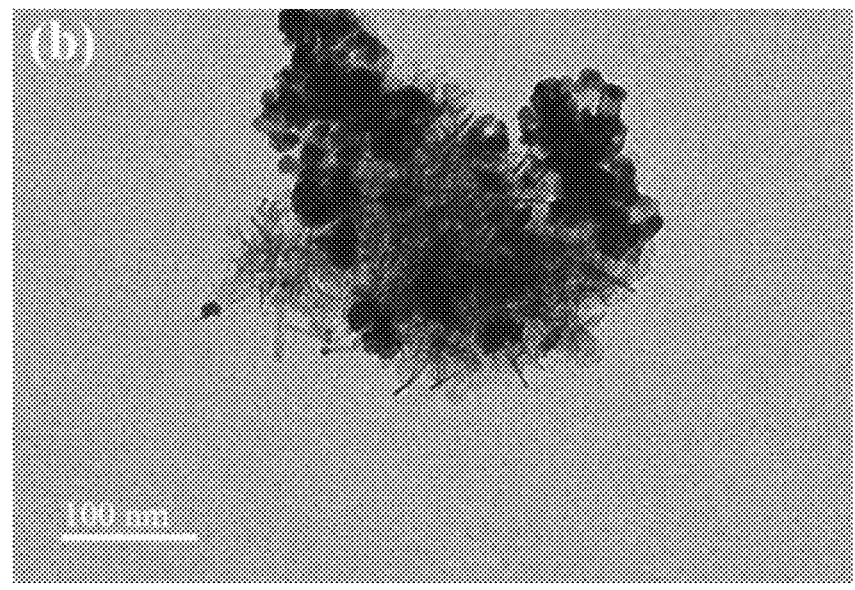
FIG. 4b is a crystal structure of the gold nanocomposite in a preferred embodiment of the present invention.

As shown in FIGS. 4a and 4b, the crystal structure of manganese dioxide (MnO$_2$) nanomaterial and gold-coated manganese dioxide nanocomposites (Au@MnO$_2$) were observed through TEM. In FIG. 4a, a highly uniform flower structure of manganese dioxide (MnO$_2$) nanomaterial was observed. In FIG. 4b, the gold nanoparticles (Au) uniformly coated on the surface of the manganese dioxide (MnO$_2$) nanomaterial.

Figure 4C:
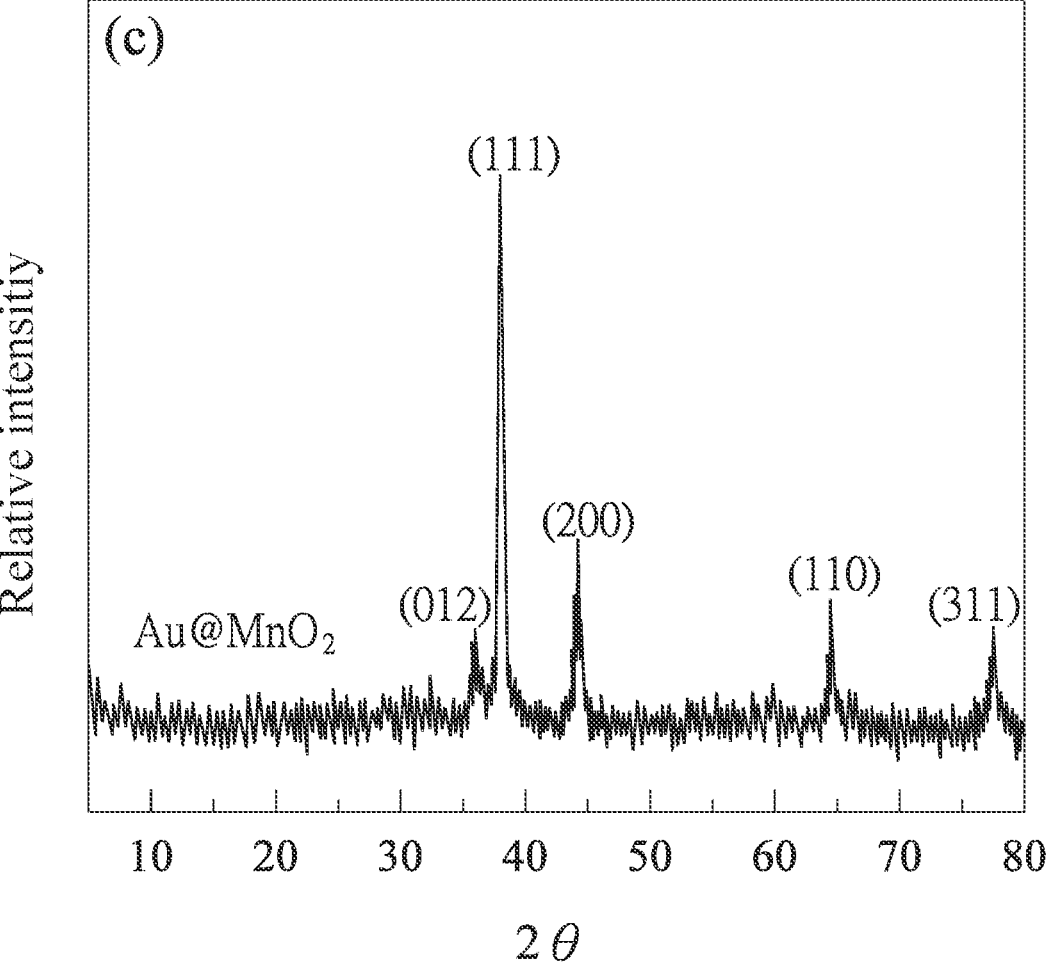
FIG. 4c is a X-ray diffraction of the product obtained from step 3 of a preferred embodiment of the present invention.

In FIG. 4c, through X-ray Diffraction (XRD) analysis, three weak diffraction peaks of gold-coated manganese dioxide nanocomposites (Au@MnO$_2$) formed at 12.3 degrees, 37.4 degrees and 65.5 degrees were observed and corresponded to the positions (003), (012) and (110) in the lattice plane of the nanoparticles, which was classified to the diffraction peaks of manganese dioxide (MnO$_2$). In addition to the diffraction peaks referred to manganese dioxide (MnO$_2$), the diffraction peaks of the gold nanoparticles (Au) could also be seen in FIG. 4c, located at 38.5 degrees, 44.6 degrees and 77.8 degrees, which can correspond to the positions (111), (200) and (311) in the lattice plane of the nanoparticles belong to the face-centered cubic lattice structure of gold nanoparticles (Au), which means The gold nanoparticles were successfully coated on the surface of manganese dioxide (MnO$_2$).

The following step S4 of preparing the electrochemical biosensor has been described in the above paragraphs, and not repeated here. In step S5, heat shock protein (Hsp70) was further used as the target to be detected to form the specific electrochemical immunosensor, and as an example of testing the electrochemical characteristics of the biological electrochemical immunosensor. Wherein, the primary antibody 20 was a heat shock protein antibody (antiHsp70), and the antigen 30 was a heat shock protein (Hsp70).

By cyclic voltammetry (CV) and electrochemical impedance spectroscopy (EIS), the electrochemical characteristics difference of each preparation step of the biological electrochemical immunosensor was observed.

Figure 5:
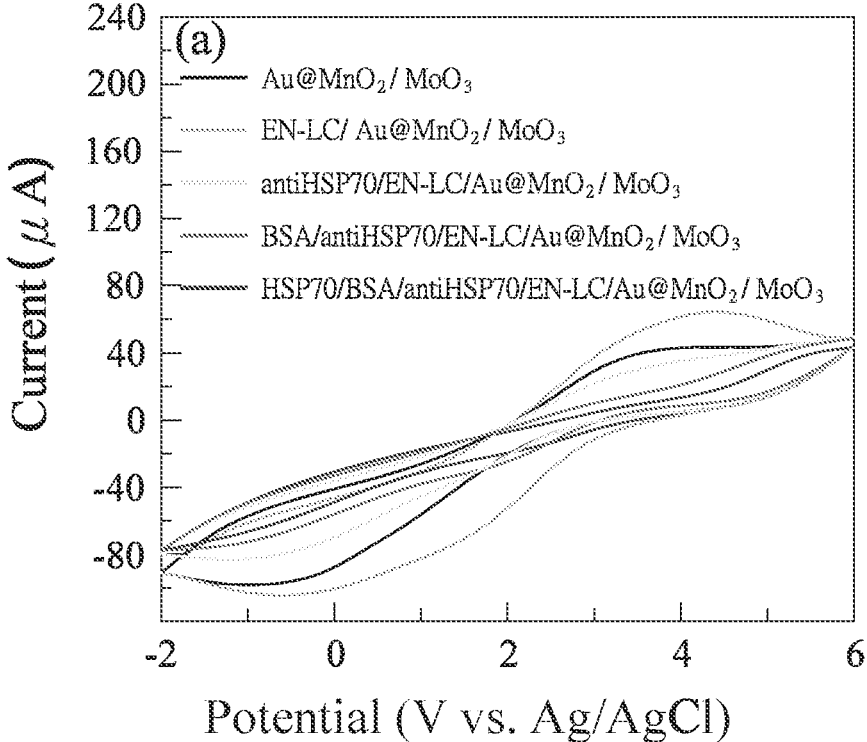
FIG. 5 is a cyclic voltammetry chart of the first preferred embodiment of the present invention.

Cyclic voltammetry (CV) was a method to provide a current to the biological electrochemical immunosensor after each step of preparation for checking by changing the potential over time, and a cyclic voltammogram as shown in FIG. 5. The electrochemical characteristics difference of the biological electrochemical immunosensor after each step of preparation could be obtained. The data showed the variation of the working electrode 10 after modification (Au@MnO$_2$/MoO$_3$), the working electrode 10 after modification (EN-LC/Au@MnO$_2$/MoO$_3$), the working electrode 10 attached to the primary antibody 20 (antiHsp70/EN-LC/Au@MnO$_2$/MoO$_3$), the working electrode 10 reacted with bovine serum albumin 21 (BSA/antiHsp70/EN-LC/Au@MnO$_2$/MoO$_3$) and the working electrode 10 attached the antigen 30 (Hsp70/BSA/antiHsp70/EN-LC/Au@MnO$_2$/MoO$_3$).

As shown in FIG. 5, it was observed that the working electrode 10 after modification (EN-LC/Au@MnO$_2$/MoO$_3$) showed the highest redox current capability due to in the amine group (NH2) of L-cysteine promote electron transfer. When the working electrode 10 reacted with L-cysteine and EDC/NHS, L-cysteine and EDC/NHS formed a stable reaction intermediate product (intermediate active ester), and exhibited excellent electrochemical properties. Therefore, the working electrode 10 (EN-LC/Au@MnO$_2$/MoO$_3$) modified by L-cysteine and EDC/NHS would increase the redox current capability.

However, whether the working electrode 10 was attached to the primary antibody 20 (antiHsp70/EN-LC/Au@MnO$_2$/MoO$_3$), the redox current capability decreased after reacting with bovine serum albumin 21 (BSA/antiHsp70/EN-LC/Au@MnO$_2$/MoO$_3$) or after attaching the antigen 30 (Hsp70/BSA/antiHsp70/EN-LC/Au@MnO$_2$/MoO$_3$). It was because antiHSP70, BSA, and HSP70 were insulating substances that resist redox reactions. Therefore, the oxidation current capability of the working electrode 10 decreases after being modified by antiHSP70, BSA, and HSP70, respectively.

By electrochemical impedance spectroscopy (EIS), the variation of electrochemical properties of the working electrode 10 after modification (Au@MnO$_2$/MoO$_3$), the working electrode 10 after modification (EN-LC/Au@MnO$_2$/MoO$_3$), after the working electrode 10 attached to the primary antibody 20 (antiHsp70/EN-LC/Au@MnO$_2$/MoO$_3$), after the working electrode 10 reacted with bovine serum albumin 21 (BSA/antiHsp70/EN-LC/Au@MnO$_2$/MoO$_3$) and the working electrode 10 after attached the antigen 30 (Hsp70/BSA/antiHsp70/EN-LC/Au@MnO$_2$/MoO$_3$) were compared.

Figure 6:
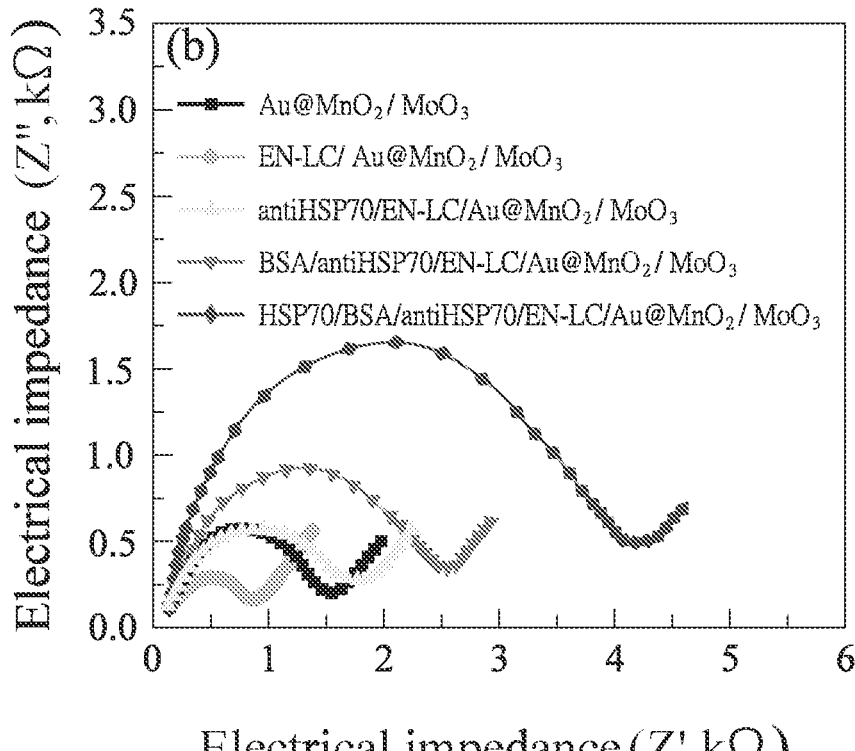
FIG. 6 is an electrochemical impedance chart of the first preferred embodiment of the present invention.

As shown in FIG. 6, the electrochemical impedance spectrum of each group contains a semicircle and a linear part, the linear part represents the relation of diffusion, and the diameter of the semicircle is the distance between the X-axis of the semicircle corresponding to the electron transfer resistance. The starting point, also known as Rs (solution resistance), represents the electrical impedance of the solution; the size of the semicircle in the high-frequency region after the starting point of Rs, also known as Rct (charge transfer resistance), represents the electrolyte and the electrode the magnitude of the charge transfer resistance between them. Equivalent series resistance (ESR) is the sum of Rs and Rct, so the Rct value of each group can be calculated according to this rule.

Among them, the Rct values of each group are: Au@MnO$_2$/MoO$_3$ was 1.38 k$\Omega$; EN-LC/Au@MnO$_2$/MoO$_3$ was 0.72 k$\Omega$; antiHSP70/EN-LC/Au@MnO$_2$/MoO$_3$ was 1.74 k$\Omega$; BSA/antiHSP70/EN-LC/Au@MnO$_2$/MoO$_3$ ws 2.43 k$\Omega$; and HSP70/BSA/antiHSP70/EN-LC/Au@MnO$_2$/MoO$_3$ was 4.47 k$\Omega$.

The Rct value of each group showed when L-cysteine and EDC/NHS was added, the resistance value was reduced. Such result indicated that L-cysteine and EDC/NHS promoted electron transfer, so by modifying L-cysteine and EDC/NHS of the working electrode 10 (EN-LC/Au@MnO$_2$/MoO$_3$) decreased Rct value. Similarly, by modification of non-conductive substances antiHSP70, BSA and HSP70 of working electrode 10, the Rct value increased accordingly. It was noticed that EIS value was consistent with CV value, and such trend also indicated that the specific electrochemical immunosensor targeting the heat shock protein Hsp70 was successfully prepared.

The present invention further used the heat shock protein Hsp70 as the optimal candidate for the electrochemical immunosensor (following represented as HSP70 electrochemical immunosensor) to know the optimal concentration of the primary antibody 20, and the optimal reaction time of the primary antibody 20, the bovine serum albumin (BSA) 21 and the antigen 30, respectively.

Figure 7A:
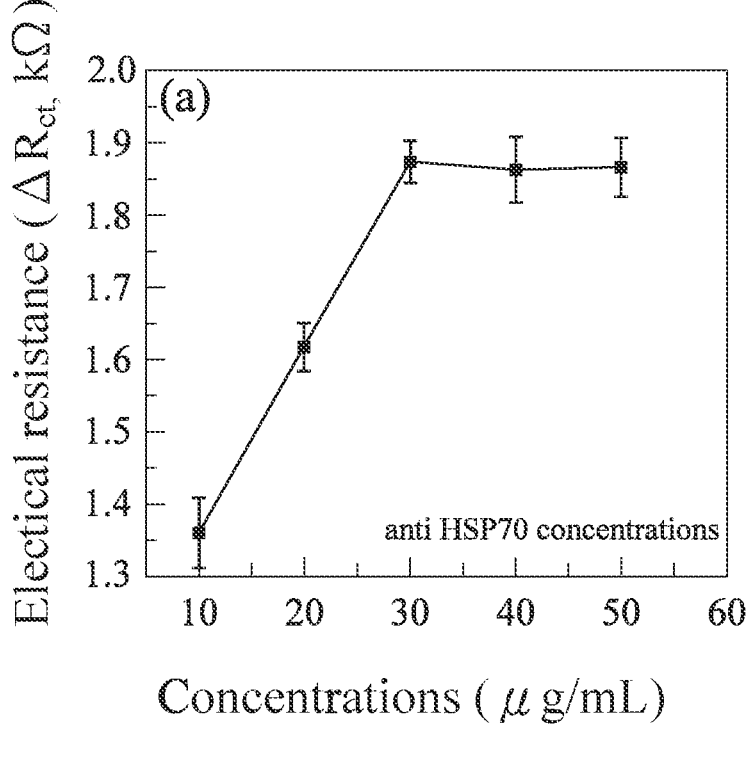
FIG. 7a is a chart of antibody concentration comparison in the first preferred embodiment of the present invention.

Please refer to FIG. 7a, in order to select the optimal concentration of the primary antibody 20, the heat shock protein antibody (antiHsp70) at different concentrations for making the HSP70 electrochemical immunosensor was prepared, and the electrochemical properties of each HSP70 electrochemical immunosensors were compared. Preferably, the concentration of heat shock protein antibody (antiHsp70) wa 10 μg/mL, 20 μg/mL, 30 μg/mL, 40 μg/mL and 50 μg/mL.

Preferably, the electrochemical characteristics of the HSP70 electrochemical immunosensor reacted with different concentration of the antiHsp70 were represented as a resistance difference (ΔRct), and the ΔRct value was calculated as follows:

$$\Delta Rct = Rct \ (HSP70/BSA/antiHSP70/EN-LC/ \\ Au@MnO_2/MoO_3) - Rct \ (BSA/antiHSP70/EN- \\ LC/Au@MnO_2/MoO_3)$$

From the results, it could be known that by the increasing of the antiHsp70 concentration, the ΔRct value of different HSP70 electrochemical immunosensor increasing thereupon, indicated that the HSP70 electrochemical immunosensor binds more antiHsp70. However, after the concentration of antiHsp70 reached 30 μg/mL, the ΔRct value of each HSP70 electrochemical immunosensor became stabilized, indicating that the HSP70 electrochemical immunosensor and antiHsp70 reached to saturated at antiHsp70 concentration of 30 μg/mL. Therefore, 30 μg/mL could be determined as the optimal antibody concentration of the primary antibody 20.

Figure 7B:
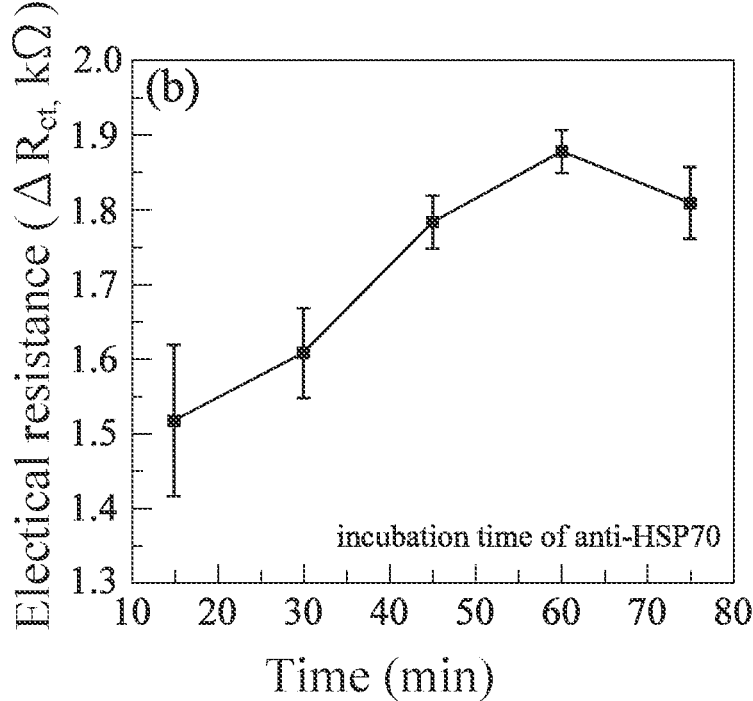
FIG. 7b is a chart of antibody reaction in the first preferred embodiment of the present invention.

Please refer to FIG. 7b, to determine the optimal reaction time of the primary antibody 20, the biological electrochemical immunosensor was reacted with 30 μg/mL of antiHsp70 in different time points, and the electrochemical properties of each of the HSP70 electrochemical immunosensors were further compared. Wherein, the reaction times of the antiHsp70 were 15, 30, 45, 60 and 75 minutes, respectively. The ΔRct values of each HSP70 electrochemical immunosensor were also observed as the basis for evaluating the electrochemical characteristics.

From the results, it was known that as the reaction time of the heat shock protein antibody (antiHsp70) increased, the ΔRct values of each HSP70 electrochemical immunosensor increased accordingly, indicating that each biological electrochemical immune sensors having a longer time to effectively bind to antiHsp70, and having the maximum ΔRct value at 60 minutes. It was worth noting that when the reaction time exceeds 60 minutes, the ΔRct value tends to decrease, indicating that the binding efficiency of the heat shock protein antibody (antiHsp70) to the biological electrochemical immunosensor decreases. Therefore, it was determine that 60 minutes could be the optimum reaction time of the primary antibody 20.

Figure 7C:
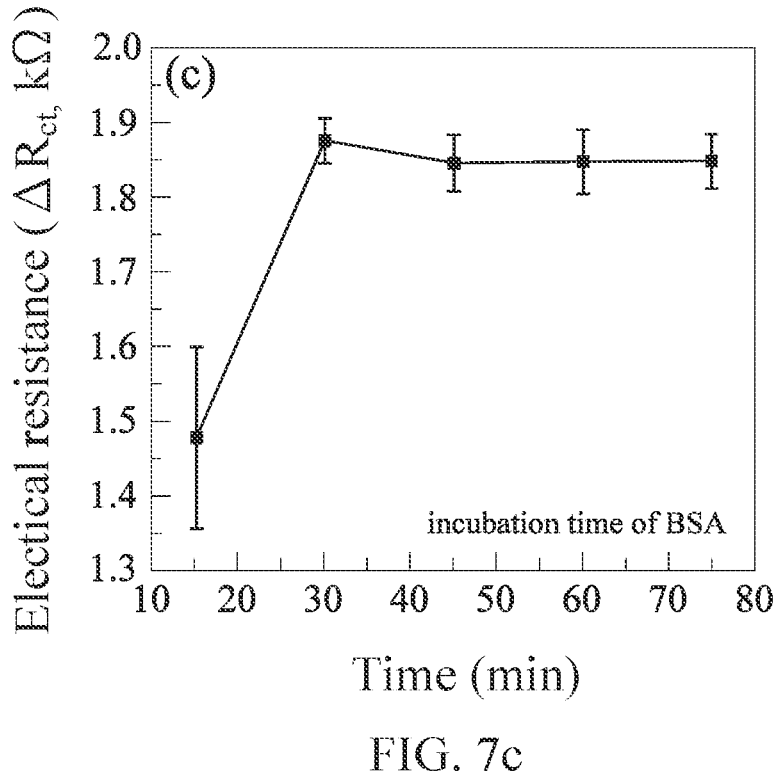
FIG. 7c is a chart of BSA reaction of the first preferred embodiment of the present invention.

Please refer to FIG. 7c the difference of reaction time between the biological electrochemical immunosensor and the bovine serum albumin (BSA) 21 was further compared, and the ΔRct value of HSP70 electrochemical immunosensing was used as the basis for evaluating the electrochemical characteristics. When the concentration of antiHsp70 was 30 ng/mL and the antibody incubation time was 60 minutes, the reaction times of the heat shock protein antibody (antiHsp70) were 15, 30, 45, 60 and 75 minutes, respectively. It could be observed when the reaction time of the heat shock protein antibody (antiHsp70) exceeds 30 min, the ΔRct value of the HSP70 electrochemical immunosensor tends to be stable, indicating that BSA 21 and the biological electrochemical immunosensor could effectively cover nonspecific targets after reacting for 30 minutes.

Figure 7D:
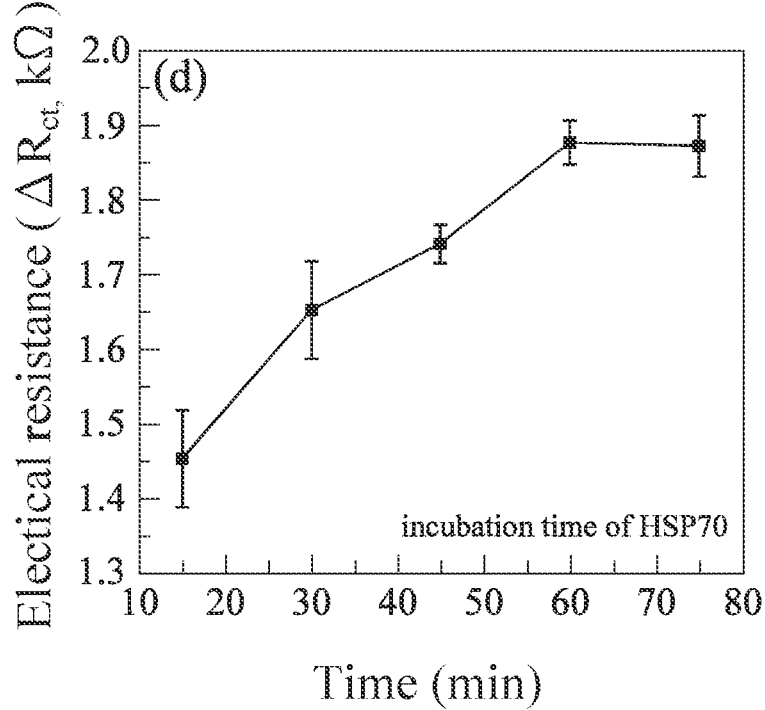
FIG. 7d is a chart of the antigenic reaction of the first preferred embodiment of the present invention.

Please refer to FIG. 7d, in order to determine the optimal reaction time of the antigen 30, the biological electrochemical immunosensor reacted with the antigens under 15, 30, 45, 60 and 75 minutes respectively in the present invention. The concentration of antiHsp70 was μg/mL and incubated with the antibody for 60 minutes, and the reaction time of the antiHsp70 was 30 minutes and the reaction times of Hsp70 were 15, 30, 45, 60 and 75 minutes, respectively. It was found that as the reaction time of the heat shock protein Hsp70 increased, the ΔRct value of the HSP70 electrochemical immunosensor increased, indicating that a longer time for the antiHsp70 binding to the Hsp70. The maximum ΔRct value was reached when the reaction time was 60 minutes. After 60 minutes, the ΔRct value did not change much. Therefore, 60 minutes could be used as a better reaction time for binding to the antigen 30.

Figure 8A:
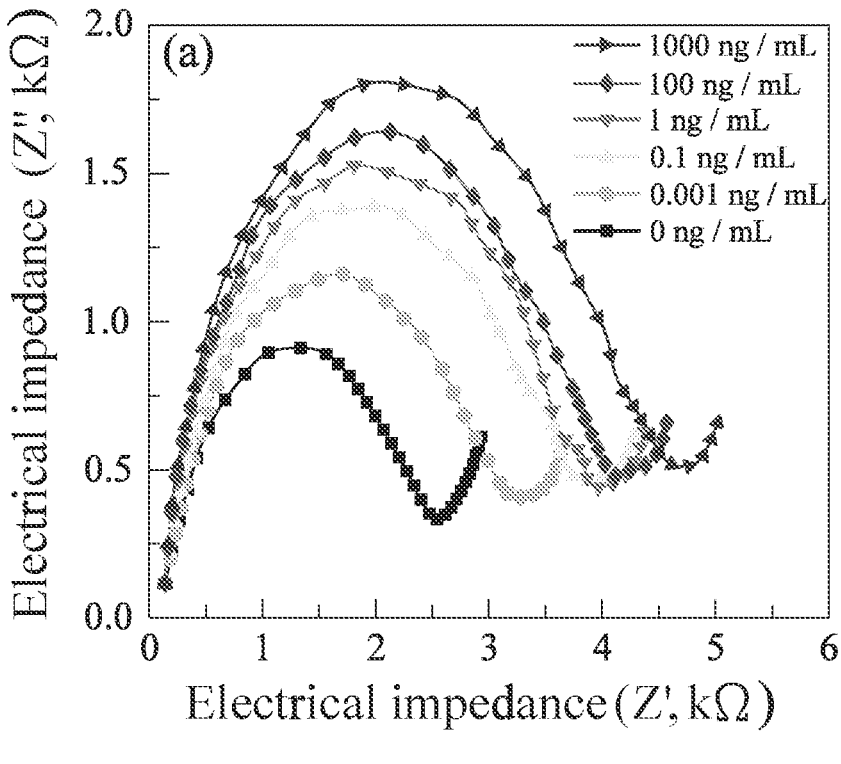
FIG. 8a is a chart of antigen concentration in the first preferred embodiment of the present invention.
Figure 8B:
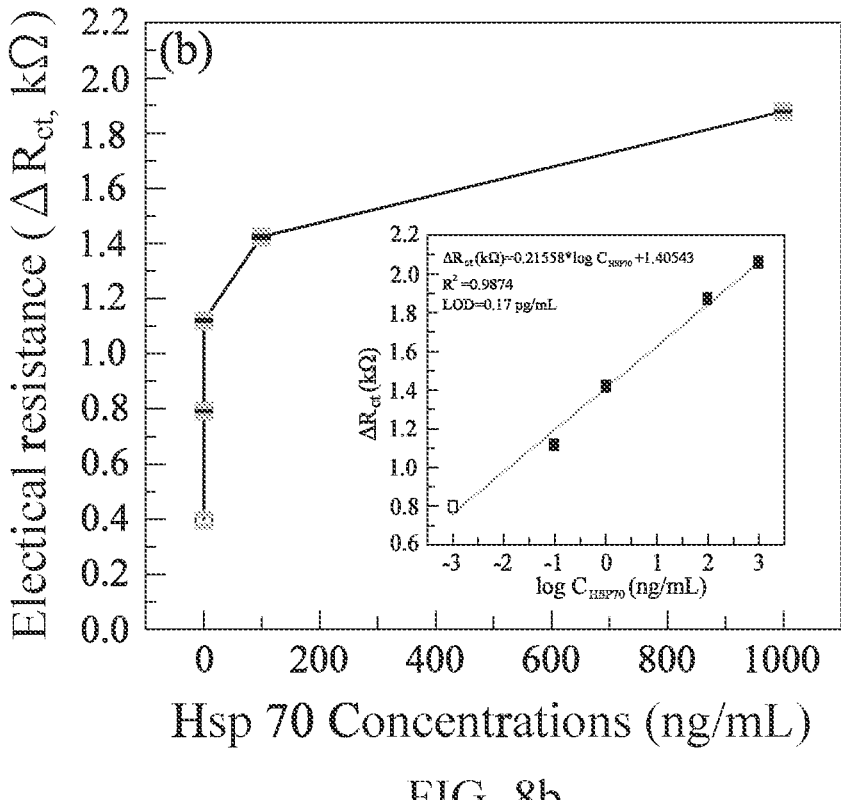
FIG. 8b is a detection result of the antigen of the first preferred embodiment of the present invention.

Further, please refer to FIGS. 8a and 8b, the HSP70 electrochemical immunosensor was tested for the detection limit and detection range of the specific electrochemical immunosensor of the present invention. Wherein, the primary antibody 20 and the bovine serum albumin 21 were both carried out at the above-mentioned preferred reaction concentration and reaction time, and the relevant steps were also described in the above paragraphs with no more detailed description here.

The difference was that the different concentrations of the heat shock protein Hsp70 were used to react with the HSP70 electrochemical immunosensor in 0.1 M NaCl solution containing 5 mM hexacyanoferrate (III) salt ([Fe(CN)$_6$]$^{3-}$) by electrochemical impedance spectroscopy (EIS), and the detection limit and detection range of the HSP70 electrochemical immunosensor were quantified. In electrochemical impedance spectroscopy, the hexacyanoferrate (III) salt ([Fe(CN)$_6$]$^{3-}$) could be replaced by hexacyanoferrate (II) salt ([Fe(CN)$_6$]$^{4-}$), due to the addition of the hexacyanoferrate

11

(III)([Fe(CN)$_6$]$^{3-}$)/the hexacyanoferrate(II)([Fe(CN)$_6$]$^{4-}$) to the NaCl solution showed a fast oxidation-reduction reaction and enhanced the electron transfer of the electrode interface to obtain the impedance value.

Preferably, the concentration of the heat shock protein Hsp70 was 0 ng/mL, 0.001 ng/mL, 0.1 ng/mL, 1 ng/mL, 100 ng/mL, and 1000 ng/mL. As shown in FIG. 8*a*, it was showed when the concentration of the heat shock protein Hsp70 was higher, the semicircle of the electrochemical impedance diagram became larger. As shown in FIG. 8*b*, the linear relationship between the concentration of the heat shock protein Hsp70 and the HSP70 electrochemical immunosensor was further observed through the following equation.

$$\Delta Rct(k\Omega)=0.21558 \log CHsp70 \text{ (ng/mL)}+1.40543$$

In accordance with FIG. 8*b*, it was found that the concentration of the heat shock protein Hsp70 is proportional to the $\Delta Rct$ value when the logarithm was taken, and a detection range of the Hsp70 electrochemical immunosensor was in a range of 0.001 to 1000 ng/mL. By further calculation by the equation, the standard deviation and slope of FIG. 8*b* were obtained. The detection limit was calculated by the following formula, and a detection limit (LoD) of the HSP70 electrochemical immunosensor was 0.17 pg/mL, which was suitable for the standard value of the heat shock protein as high as 5.3 ng/mL of healthy human serum. The formula for calculating the limit of detection (LoD) is:

$$LOD=3 \text{ standard deviation } (\sigma)/\text{slope } (b)$$

The present invention further provides a second and a third preferred embodiments, which are respectively modified by calreticulin (CRT) and high mobility group box 1 (HMGB1) for preparing a CRT electrochemical immune sensor and a HMGB1 electrochemical immune sensor. The other embodiments were used to test if different specific electrochemical immunosensors would affect its electrochemical characteristics.

Figure 9A:
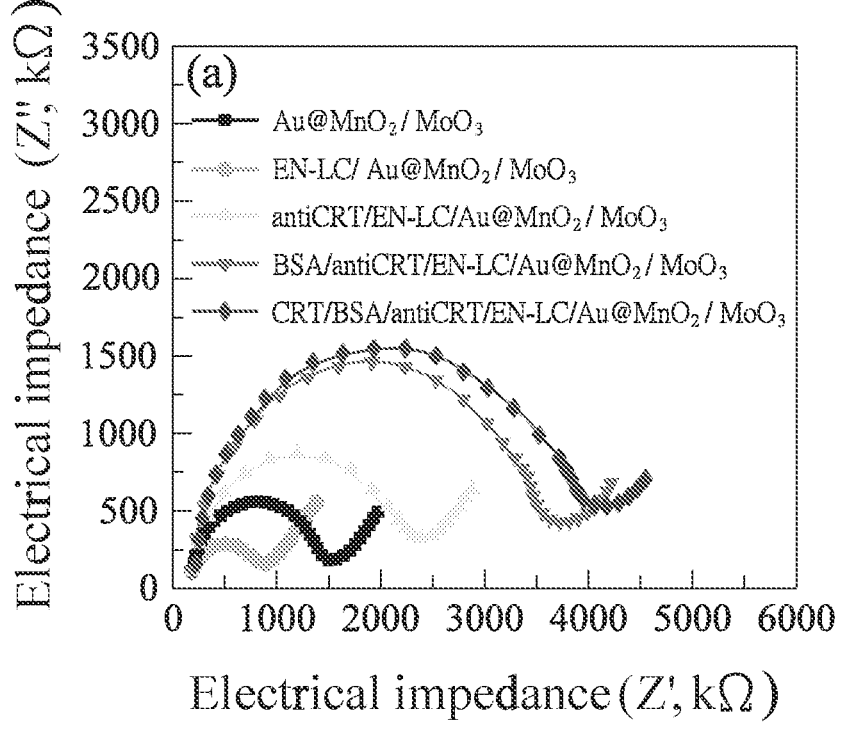
FIG. 9a is a cyclic voltammetry chart of the second preferred embodiment of the present invention.

Preferably, FIG. 9*a* was the result of CRT electrochemical immunosensor, and the primary antibody 20 was calreticulin antibody (antiCRT), and the antigen 30 was calreticulin (CRT). The variation of electrochemical characteristics between the working electrode 10 (Au@MnO$_2$/MoO$_3$) was modified, the working electrode 10 (EN-LC/Au@MnO$_2$/MoO$_3$) was modified, the primary antibody 20 was attached to the working electrode 10 (antiCRT/EN-LC/Au@MnO$_2$/MoO$_3$), the working electrode 10 reacted with bovine serum albumin 21 (BSA/antiCRT/EN-LC/Au@MnO2/MoO3), and the antigen 30 was attached to the working electrode 10 (CRT/BSA/antiCRT/EN-LC/Au@MnO2/MoO3) were compared when prepared.

Figure 9B:
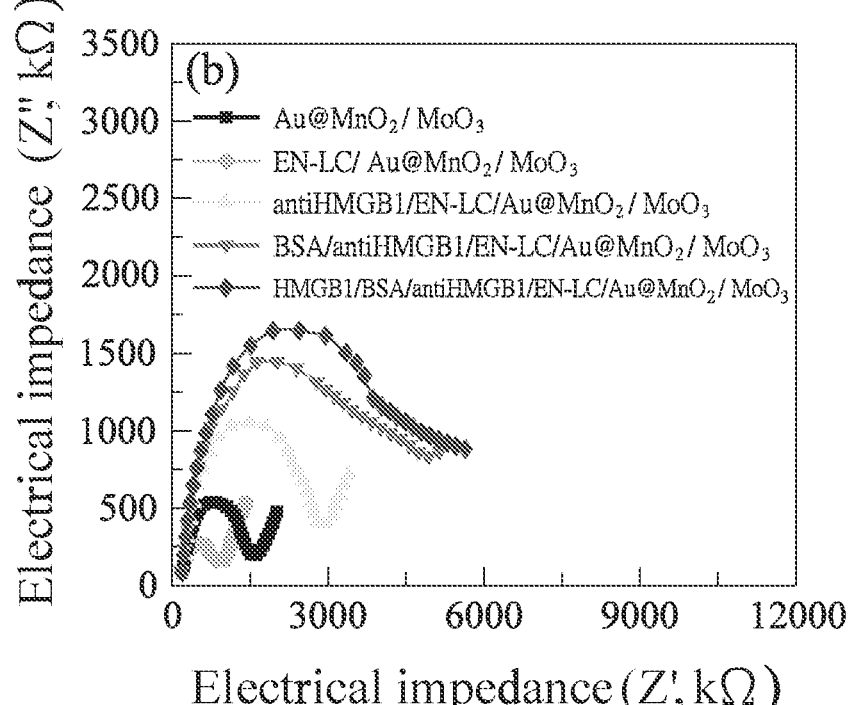
FIG. 9b is a cyclic voltammetry chart of the third preferred embodiment of the present invention.

FIG. 9*b* was the result of HMGB1 electrochemical immunosensor, the primary antibody 20 was high mobility group protein 1 antibody (antiHMGB1), and the antigen 30 was high mobility group protein 1 (HMGB1), respectively. The variation of the electrochemical characteristics of the specific electrochemical immunosensor between the working electrode 10 (Au@MnO$_2$/MoO$_3$) was modified, the working electrode 10 (EN-LC/Au@MnO$_2$/MoO$_3$) was modified, and he primary antibody 20 was attached to the working electrode 10 (antiHMGB1/EN-LC/Au@MnO$_2$/MoO$_3$), bovine serum albumin 21 was attached to the working electrode 10 (BSA/antiHMGB1/EN-LC/Au@MnO$_2$/MoO$_3$), and the antigen 30 was attached to the working electrode 10 (HMGB1/BSA/antiHMGB1/EN-LC/Au@MnO$_2$/MoO$_3$) were compared in each step of the preparation process.

The concentration, reaction time and the preparation method of the primary antibody 20 were described in the above paragraphs. The results in FIGS. 9*a* and 9*b* could correspond to FIG. 5 which the specific electrochemical immunosensor made with heat shock protein (Hsp70). It is proved that the biological electrochemical immunosensor provided by the present invention could be applied to various detection targets and made into the specific electrochemical immunosensor.

The present invention further provides a fourth and a fifth preferred embodiments, which were different from the previous embodiments in that zinc oxide (ZnO) nanomaterials were used as the metal oxide nanomaterial in step S2 to form gold attached zinc nanocomposite material (Au@ZnO) in the biological electrochemical immunosensor. The heat shock protein (Hsp70) and calreticulin (CRT) were used as the targets of the Hsp70 electrochemical immunosensor and the CRT electrochemical immunosensor, respectively, Therefore, the selection of different metal oxide nanomaterial for the biological electrochemical immunosensor and making it into a specific electrochemical immunosensor will affect its electrochemical characteristics.

Figure 10A:
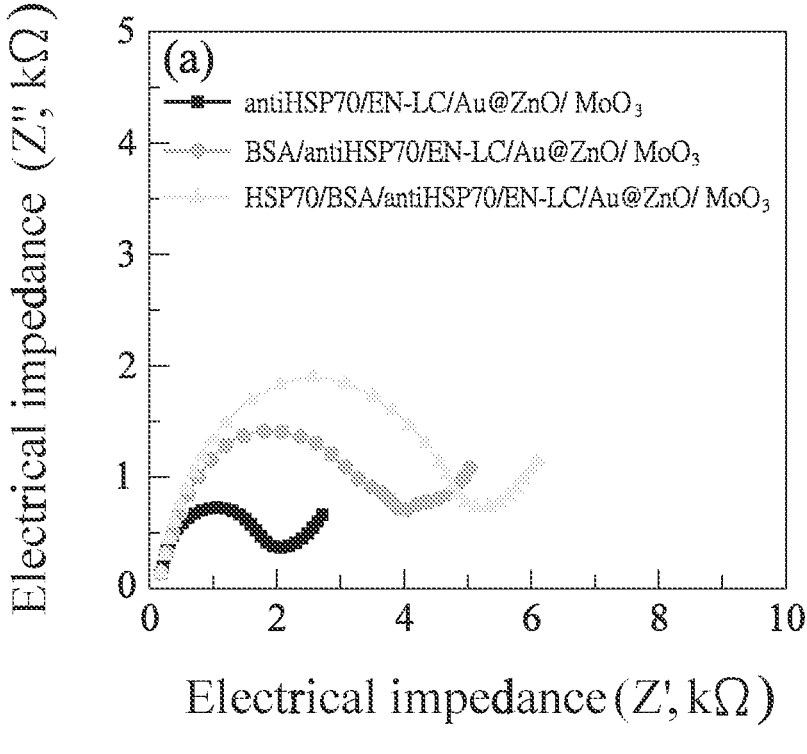
FIG. 10a is a cyclic voltammetry chart of the fourth preferred embodiment of the present invention.

Preferably, FIG. 10*a* showed the result of the Hsp70 electrochemical immunosensor, the primary antibody 20 was a heat shock protein antibody (antiHsp70), and the antigen 30 was the heat shock protein (Hsp70). The electrochemical variation of the electrode 10 (Au@ZnO/MoO3) was modified, the working electrode 10 (EN-LC/Au@ZnO/MoO3) was modified, the primary antibody 20 attached to the working electrode 10 (antiHsp70/EN-LC/Au@ZnO/MoO$_3$), bovine serum albumin 21 attached to the working electrode 10 (BSA/antiHsp70/EN-LC/Au@ZnO/MoO$_3$), and the antigen 30 attached to the working electrode 10 (Hsp70/BSA/antiHsp70/EN-LC/Au@ZnO/MoO$_3$) were compared in each step of the preparation process.

Figure 10B:
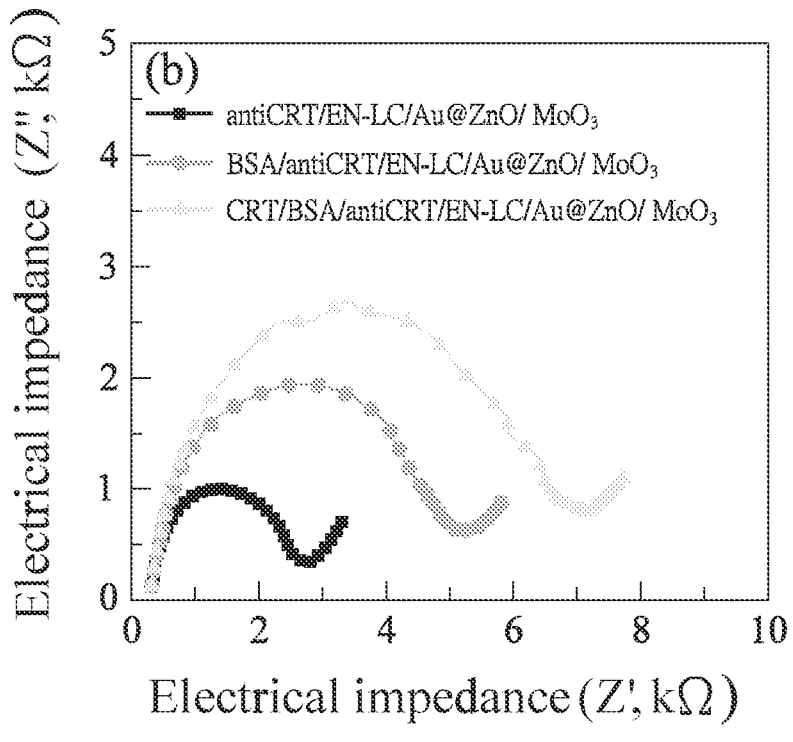
FIG. 10b is a cyclic voltammetry chart of the fifth preferred embodiment of the present invention.

FIG. 10*b* was the result of the CRT electrochemical immunosensor, the primary antibody 20 was calreticulin antibody (antiCRT), and the antigen 30 was calreticulin (CRT). The electrochemical variation of the working electrodes 10 (Au@ZnO/MoO$_3$) was modified, the working electrode 10 (EN-LC/Au@ZnO/MoO3) was modified, the primary antibody 20 attached to the working electrode 10 (antiCRT/EN-LC/Au@ZnO/MoO$_3$), bovine serum albumin 21 attached to the working electrode 10 (BSA/antiCRT/EN-LC/Au@ZnO/MoO$_3$), and the antigen 30 attached to the working electrode 10 (CRT/BSA/antiCRT/EN-LC/Au@ZnO/MoO$_3$) of the biological electrochemical immunosensor in each step of the preparation process were compared.

The concentration, time of the primary antibody 20, and the preparation method of the biological electrochemical immunosensor were described in the above paragraphs. The results shown in FIGS. 10*a* and 10*b* could also correspond to the specific electrochemical immunosensor with heat shock protein (Hsp70) as the target in FIG. 5. It was proved that the biological electrochemical immunosensor with zinc oxide (ZnO) nanomaterial still showed the specific biological electrochemical properties.

In the sixth and seventh preferred embodiments, the difference from the previous embodiments is that tungsten trioxide (WO$_3$) nanomaterial was used in step S2 to form gold-coated tungsten nanomaterial. The composite material (Au@WO$_3$) was used as the gold nanocomposite to make the biological electrochemical immunosensor. The heat shock protein (Hsp70) and calreticulin (CRT) were used as the targets to the Hsp70 electrochemical immunosensor and the CRT electrochemical immunosensor, respectively.

Therefore, the selection of different metal oxide nanomaterial for the biological electrochemical immunosensor and making it into a specific electrochemical immunosensor will affect its electrochemical characteristics.

Figure 11A:
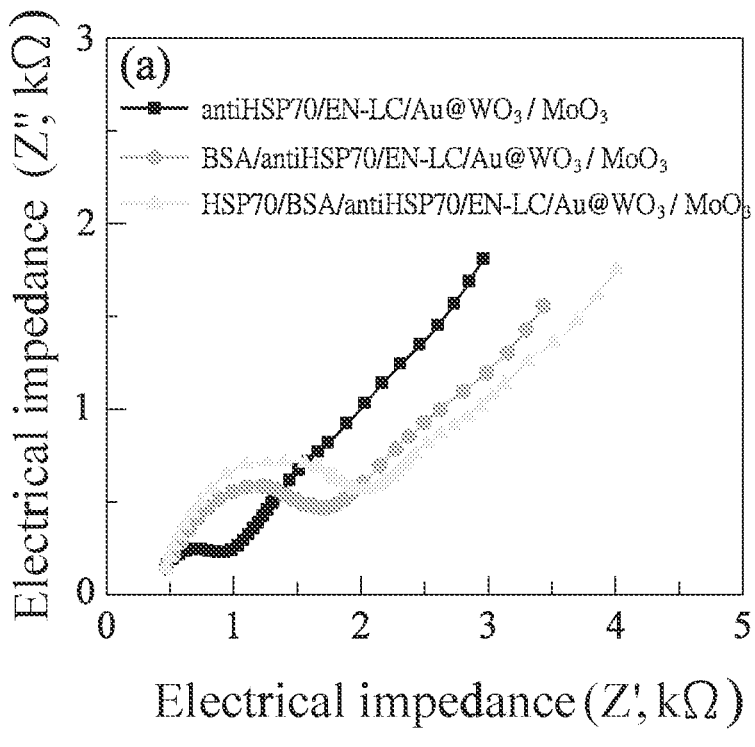
FIG. 11a is a cyclic voltammetry chart of the sixth preferred embodiment of the present invention.

FIG. 11a was the result of the Hsp70 electrochemical immunosensor, the primary antibody 20 was a heat shock protein antibody (antiHsp70), and the antigen 30 was a heat shock protein (Hsp70). The electrochemical variation of the primary antibody 20 attached to the electrode 10 (antiHsp70/EN-LC/Au@WO₃/MoO₃), bovine serum albumin 21 attached to the working electrode 10 (BSA/antiHsp70/EN-LC/Au@WO₃/MoO₃), and the antigen 30 attached to the working electrode 10 (Hsp70/BSA/antiHsp70/EN-LC/Au@WO₃/MoO₃) of the biological electrochemical immunosensor in each step of the preparation process were prepared.

Figure 11B:
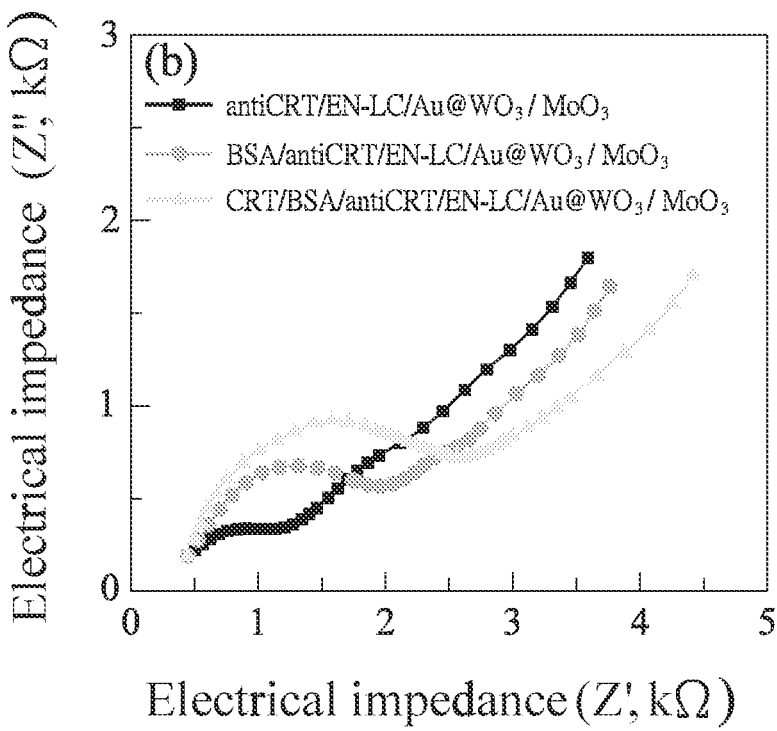
FIG. 11b is a cyclic voltammetry chart of the seventh preferred embodiment of the present invention.

FIG. 11b was the result of the CRT electrochemical immunosensor, the primary antibody 20 was calreticulin antibody (antiCRT), and the antigen 30 was calreticulin (CRT). The electrochemical variation of the primary antibody 20 attached to working electrodes 10 (antiCRT/EN-LC/Au@WO₃/MoO₃), bovine serum albumin 21 attached to the working electrode 10 (BSA/antiCRT/EN-LC/Au@WO₃/MoO₃), and the antigen 30 attached to the working electrode 10 (CRT/BSA/antiCRT/EN-LC/Au@WO₃/MoO₃) of the biological electrochemical immunosensor in each step of the preparation process were compared.

The concentration of the primary antibody 20, time and the preparation method of the biological electrochemical immunosensor were described in the above paragraphs. The results in FIGS. 11a and 11b could correspond to the specific electrochemical immunosensor with heat shock protein (Hsp70) as the target in FIG. 5. It was proved that the biological electrochemical immunosensor provided by the present invention uses tungsten trioxide (WO₃) nanomaterial as the metal oxide nanomaterial, and the specific electrochemical immunosensor could still be produced.

It was known that the expression of heat shock protein (Hsp70) was highly correlated with the growth of cancer cells. The present invention further uses Hsp70 electrochemical immunosensor (BSA/antiHsp70/EN-LC/Au@MnO₂/MoO₃) to detect heat shock protein (Hsp70) in human non-small cell lung cancer cell line (A549 cell line).

Figure 12:
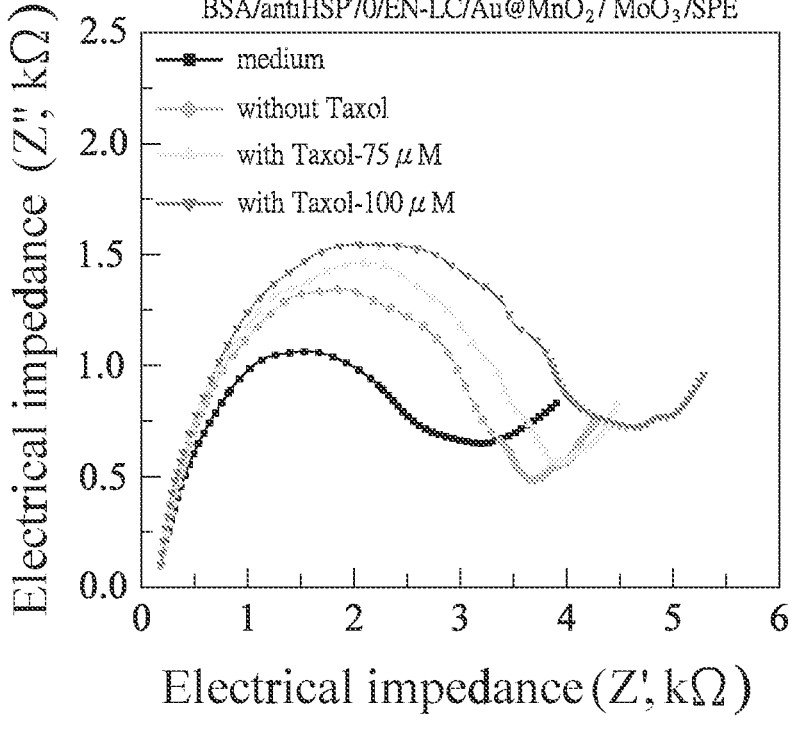
FIG. 12 is a detection result of the first preferred embodiment of the present invention.

As shown in FIG. 12, a culture solution was used as a control group, and human non-small cell lung cancer cell lines (A549 cell line) with 0, 75, 100 μM Paclitaxel (Taxol) as the treatment groups. Paclitaxel (Taxol) showed the property of killing human non-small cell lung cancer cell line (A549 cell line), heat shock protein (Hsp70) were released when human non-small cell lung cancer cell line (A549 cell line). Therefore, the Hsp70 electrochemical immunosensor provided by the present invention could be used for detecting heat shock protein (Hsp70).

It had seen that along with the increasing concentration of paclitaxel (Taxol) treating with A549 cell line, the curve (the radius) of Hsp70 electrochemical immunosensor in the voltammetry figure also increased, indicating that the Hsp70 electrochemical immunosensor was bound to a higher concentration of heat shock protein (Hsp70). Based on the results, it was inferred that the biological electrochemical immunosensor provided by the present invention showed a great possibility in applying to clinical detection.

The present invention provides an working electrode 10 through modifying molybdenum trioxide nanomaterial (MoO₃) and the gold nanocomposite, so that the working electrode 10 could show high charge transfer capability and electrochemical performance of large active surface area. In addition, molybdenum trioxide (MoO₃) itself was non-toxic, and the use of molybdenum trioxide nanomaterial (MoO₃) was not only eco-friendly to the environment, but also had better biocompatibility and enhanced biological electrochemical immunosensing detection capability.

The biological electrochemical immunosensor of the present invention could use the marker 20 specifically combined with the target according to the target, by the target combined with the marker 20 drove charge transfer and the electrical change of the biological electrochemical immune sensor in real time and accurately, and could be applied to medical detections such as cancers, immune diseases, other special diseases or genetic detections etc. therefore, the present invention showed a great potential in in medical detection fields.

What is claimed is:

1. An electrochemical biosensor, consisting essentially of a working electrode with a surface provided with a molybdenum trioxide nanomaterial and a gold nanocomposite disposed over at least a portion of the molybdenum trioxide nanomaterial for modifying the working electrode, and a carboxyl-mercapto compound and a N-3-dimethylaminopropyl-N'-ethylcarbodiimide hydrochloride/N-hydroxysuccinimide (EDC/NHS, EN) for modification, wherein, bonds form between a mercapto group of the carboxyl-mercapto compound and the gold nanocomposite, and the N-3-dimethylaminopropyl-N'-ethylcarbodiimide hydrochloride/N-hydroxysuccinimide (EDC/NHS, EN) bonds with a carboxyl group of the carboxyl-mercapto compound, marker is attached to the N-3-dimethylaminopropyl-N'-ethylcarbodiimide hydrochloride/N-hydroxysuccinimide (EDC/NHS, EN), and the gold nanocomposite is formed by gold nanoparticles coated on a surface of a metal oxide nanomaterial, wherein the metal oxide nanomaterial comprises manganese dioxide (MnO2) or zinc oxide (ZnO).

2. An electrochemical biosensor as claimed in claim 1, wherein the shape of the metal oxide nanomaterials includes rods, flakes, and spheres or flowers.

3. An electrochemical biosensor as claimed in claim 1, wherein the carboxyl-mercapto compound is cysteine.

4. An electrochemical biosensor as claimed in claim 2, wherein the carboxyl-mercapto compound is cysteine.

5. An electrochemical biosensor as claimed in claim 3, wherein the marker is a primary antibody, and the primary antibody is a heat shock protein antibody, a calreticulin antibody, or a high mobility group box protein 1 antibody.

6. An electrochemical biosensor as claimed in claim 4, wherein the marker is a primary antibody, and the primary antibody is a heat shock protein antibody, a calreticulin antibody, or a high mobility group box protein 1 antibody.

* * * * *